US012743081B2

(12) United States Patent
Suzuki

(10) Patent No.: US 12,743,081 B2
(45) Date of Patent: Sep. 22, 2026

(54) ROUTE DETERMINATION METHOD, ROUTE DETERMINATION SYSTEM, AND ROUTE DETERMINATION PROGRAM

(71) Applicant: Yanmar Holdings Co., Ltd., Osaka (JP)

(72) Inventor: Akihiro Suzuki, Osaka (JP)

(73) Assignee: Yanmar Holdings Co., Ltd., Osaka (JP)

( * ) Notice: Subject to any disclaimer, the term of this patent is extended or adjusted under 35 U.S.C. 154(b) by 55 days.

(21) Appl. No.: 17/826,010

(22) Filed: May 26, 2022

(65) Prior Publication Data

US 2022/0382292 A1 Dec. 1, 2022

(30) Foreign Application Priority Data

May 31, 2021 (JP) ................................ 2021-091528

(51) Int. Cl.

| | |
|---|---|
| ***G05D 1/00*** | (2024.01) |
| ***A01B 69/04*** | (2006.01) |
| ***A01M 7/00*** | (2006.01) |
| ***G01C 21/34*** | (2006.01) |

(52) U.S. Cl.

CPC ......... *G05D 1/0219* (2013.01); *A01B 69/008* (2013.01); *G01C 21/34* (2013.01); *A01M 7/0089* (2013.01)

(58) Field of Classification Search

CPC ..... A01B 69/008; A01B 69/00; A01B 69/004; G05D 2201/0201; G05D 1/0212; A01M 7/0042; A01M 7/0089; A01M 7/00; G01C 21/3658; G01C 21/3476; G01C 21/3617; G01C 21/34

See application file for complete search history.

(56) References Cited

U.S. PATENT DOCUMENTS

| | | | | |
|---|---|---|---|---|
| 9,020,757 B2 * | 4/2015 | Peake | ...................... | B62D 6/00 180/443 |
| 9,795,074 B2 * | 10/2017 | Stratton | ............... | A01B 79/005 |
| 2001/0021888 A1 * | 9/2001 | Burns | .................. | G05D 1/0278 701/26 |
| 2020/0033856 A1 * | 1/2020 | Nishii | .................. | G05D 1/0278 |
| 2021/0048300 A1 * | 2/2021 | Saavedra Román | ........................ | G01C 21/3476 |
| 2021/0405644 A1 * | 12/2021 | Berridge | .............. | G05D 1/0223 |

FOREIGN PATENT DOCUMENTS

| | | | | |
|---|---|---|---|---|
| CN | 106462166 A * | 2/2017 | ................ | B60P 1/04 |
| JP | 2020054317 A * | 4/2020 | | |

OTHER PUBLICATIONS

Machine Translation CN 106462166 (Year: 2017).*
Machine Translation JP 2020054317 (Year: 2020).*

* cited by examiner

*Primary Examiner* — Anne Marie Antonucci
*Assistant Examiner* — Wesam Almadhrhi
(74) *Attorney, Agent, or Firm* — Chris Mizumoto

(57) ABSTRACT

A route determination method, a route determination system, and a route determination program are provided for determining a target route where a work vehicle can work while performing automatic traveling without damaging the topsoil of the work site.

12 Claims, 12 Drawing Sheets

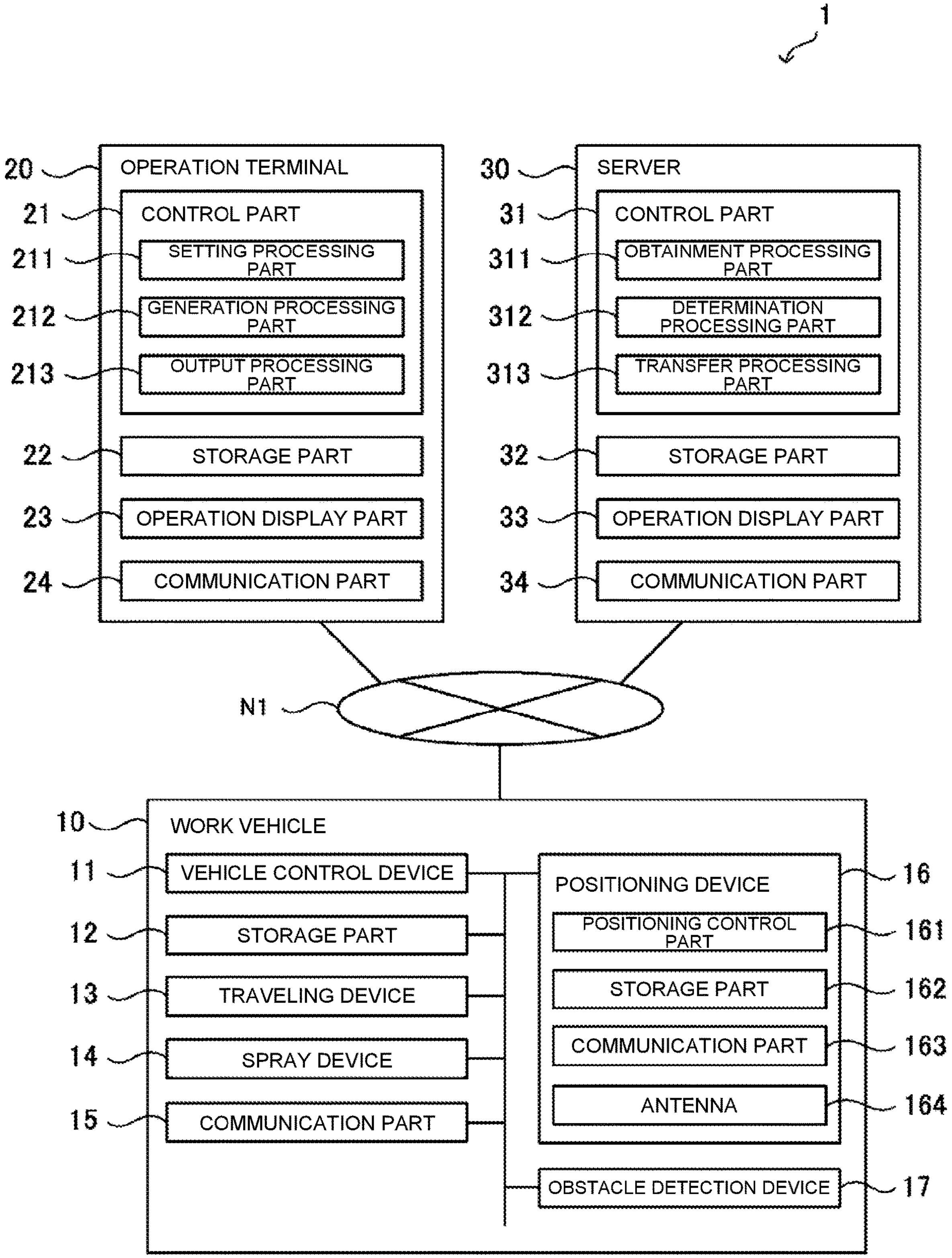

FIG. 2

20 OPERATION TERMINAL
21 CONTROL PART
211 SETTING PROCESSING PART
212 GENERATION PROCESSING PART
213 OUTPUT PROCESSING PART
22 STORAGE PART
23 OPERATION DISPLAY PART
24 COMMUNICATION PART

30 SERVER
31 CONTROL PART
311 OBTAINMENT PROCESSING PART
312 DETERMINATION PROCESSING PART
313 TRANSFER PROCESSING PART
32 STORAGE PART
33 OPERATION DISPLAY PART
34 COMMUNICATION PART

N1

10 WORK VEHICLE
11 VEHICLE CONTROL DEVICE
12 STORAGE PART
13 TRAVELING DEVICE
14 SPRAY DEVICE
15 COMMUNICATION PART
16 POSITIONING DEVICE
161 POSITIONING CONTROL PART
162 STORAGE PART
163 COMMUNICATION PART
164 ANTENNA
17 OBSTACLE DETECTION DEVICE

D1

| CANDIDATE ROUTE ID | CANDIDATE ROUTE | OFFSET AMOUNT |
|---|---|---|
| r001 | r1 | - |
| r002 | r2 | +X1 |
| r003 | r3 | −X1 |

ROUTE DETERMINATION METHOD, ROUTE DETERMINATION SYSTEM, AND ROUTE DETERMINATION PROGRAM

CROSS-REFERENCE

This application claims foreign priority of JP2021-091528 filed May 31, 2021, the disclosure of which is hereby incorporated by reference in its entirety.

TECHNICAL FIELD

The present invention relates to a route determination method, a route determination system, and a route determination program for determining a target route of a work vehicle that performs automatic traveling while performing the predetermined work on work target objects arranged in multiple rows.

BACKGROUND ART

Work vehicles that perform automatic traveling on a target route while spraying a chemical solution on crops planted in a work site such as a field or farm are known (see, for example, Patent Literature 1). For example, the aforementioned target route is generated by connecting both edge points of each row in the multiple rows where the crops are arranged (crop rows).

PRIOR ART DOCUMENT

Patent Document

Patent Document 1: Japanese Unexamined Patent Application Publication No. 2021-000021

SUMMARY OF INVENTION

Technical Problem

Since the work vehicle performs automatic traveling along the aforementioned target route that is generated, the work vehicle travels on the same place every time the work vehicle performs the work. This causes problems of damaging the topsoil of the work site in the part where the work vehicle has traveled.

The object of the present invention relates to a route determination method, a route determination system, and a route determination program for determining a target route where a work vehicle can work while performing automatic traveling without damaging the topsoil of the work site.

Solution to Problem

The route determination method according to the present invention is a method that executes generating a plurality of candidate routes which are candidates for a target route, on which a work vehicle that performs automatic traveling in a predetermined order of rows while performing predetermined work on work target objects arranged in a plurality of rows in a work site is caused to travel, and determining a first candidate route, which is selected from among the plurality of candidate routes, as the target route.

The route determination system according to the present invention includes a generation processing part and a determination processing part. The generation processing part generates a plurality of candidate routes which are candidates for a target route, on which a work vehicle that performs automatic traveling in a predetermined order of rows while performing predetermined work on work target objects arranged in a plurality of rows in a work site is caused to travel. The determination processing part determines a first candidate route, which is selected from among the plurality of candidate routes, as the target route.

The route determination program according to the present invention is a program for causing one or more processors to execute generating a plurality of candidate routes which are candidates for a target route, on which a work vehicle that performs automatic traveling in a predetermined order of rows while performing predetermined work on work target objects arranged in a plurality of rows in a work site is caused to travel, and determining a first candidate route, which is selected from among the plurality of candidate routes, as the target route.

Advantageous Effects of Invention

According to the present invention, it is possible to provide a route determination method, a route determination system, and a route determination program for determining a target route where a work vehicle can work while performing automatic traveling without damaging the topsoil of the work site.

BRIEF DESCRIPTION OF DRAWINGS

FIG. 2 is a block diagram illustrating a configuration of the automatic traveling system according to the embodiment of the present invention.

DESCRIPTION OF EMBODIMENTS

The following embodiments are embodied examples of the present invention and are not intended to limit the technical scope of the present invention.

[Automatic Traveling System 1]

Figure 1:
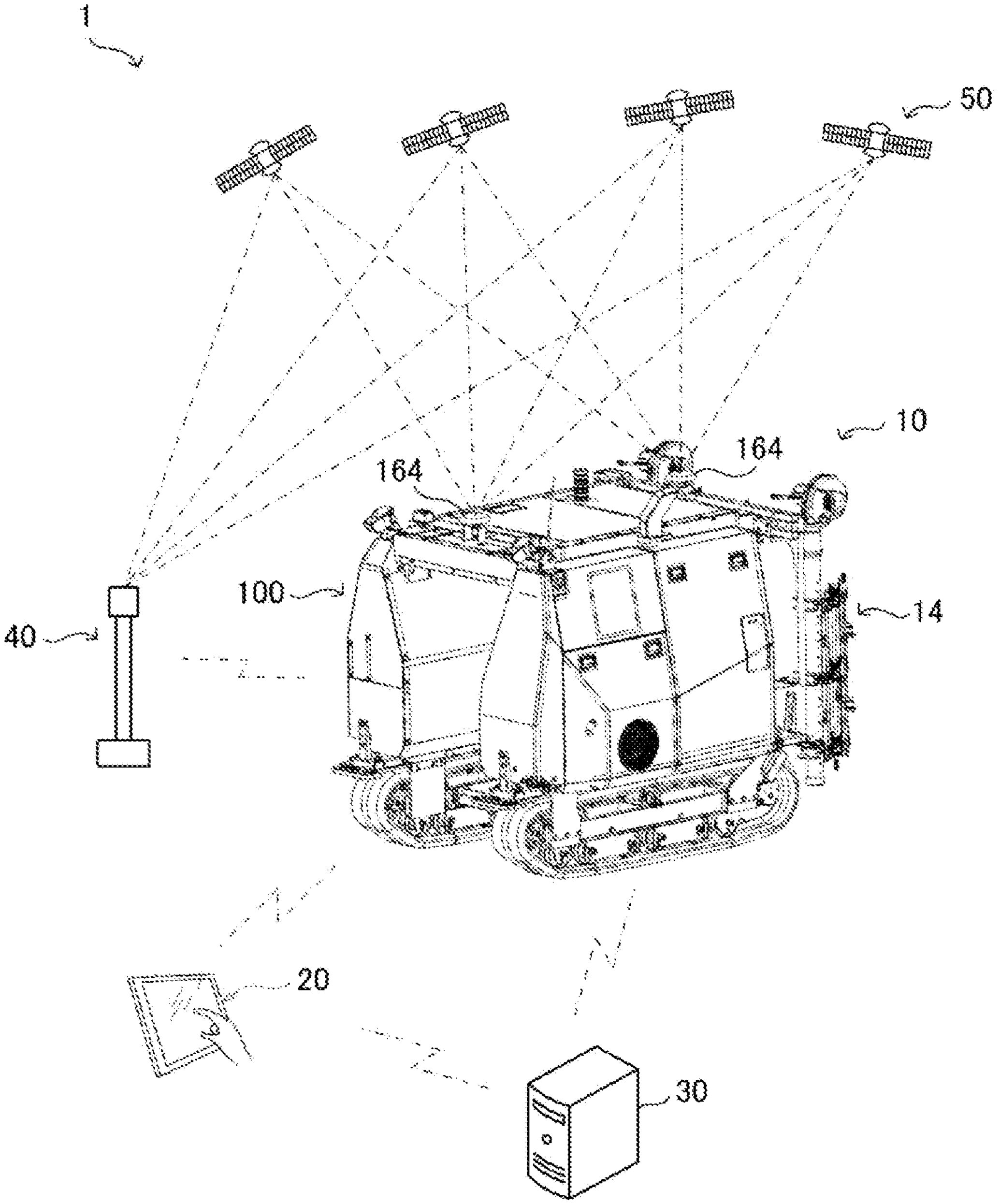
FIG. 1 is a schematic diagram illustrating an overall configuration of an automatic traveling system according to an embodiment of the present invention.

As illustrated in FIG. 1 and FIG. 2, the automatic traveling system 1 according to an embodiment of the present invention includes the work vehicle 10, the operation terminal 20, the server 30, the base station 40, and the satellite 50. The work vehicle 10, the operation terminal 20, and the server 30 can communicate with each other via the communication network N1. For example, the work vehicle 10 and the operation terminal 20 can communicate with each other via a cellular telephone line network, a packet line network, or a wireless LAN. For example, each of the work vehicle 10 and the operation terminal 20 can communicate with the server 30 via a cellular telephone line network, a packet line network, or a wireless LAN.

In the present embodiment, the case where the work vehicle 10 is a vehicle that performs the spraying work to spray a chemical solution, water, or the like on the crops V (see FIG. 5) planted in the field F is taken as an example for the explanation. The field F is an example of the work site for the present invention, and the field F is an orchard, such as a vineyard, an apple orchard, or the like. The crops V are examples of the work target objects for the present invention, and the crops V are fruit trees, such as grapes. The aforementioned spraying work is an example of the predetermined work for the present invention, and the aforementioned spraying work is the work of spraying a spraying material, such as a chemical solution, water, or the like, on the crops V. As another embodiment, it is also possible that the work vehicle 10 is a vehicle that performs the weeding work, a vehicle that performs the leaf-cutting work, or a vehicle that performs the harvesting work. The aforementioned weeding work and harvesting work are examples of the predetermined work for the present invention.

Figure 5:
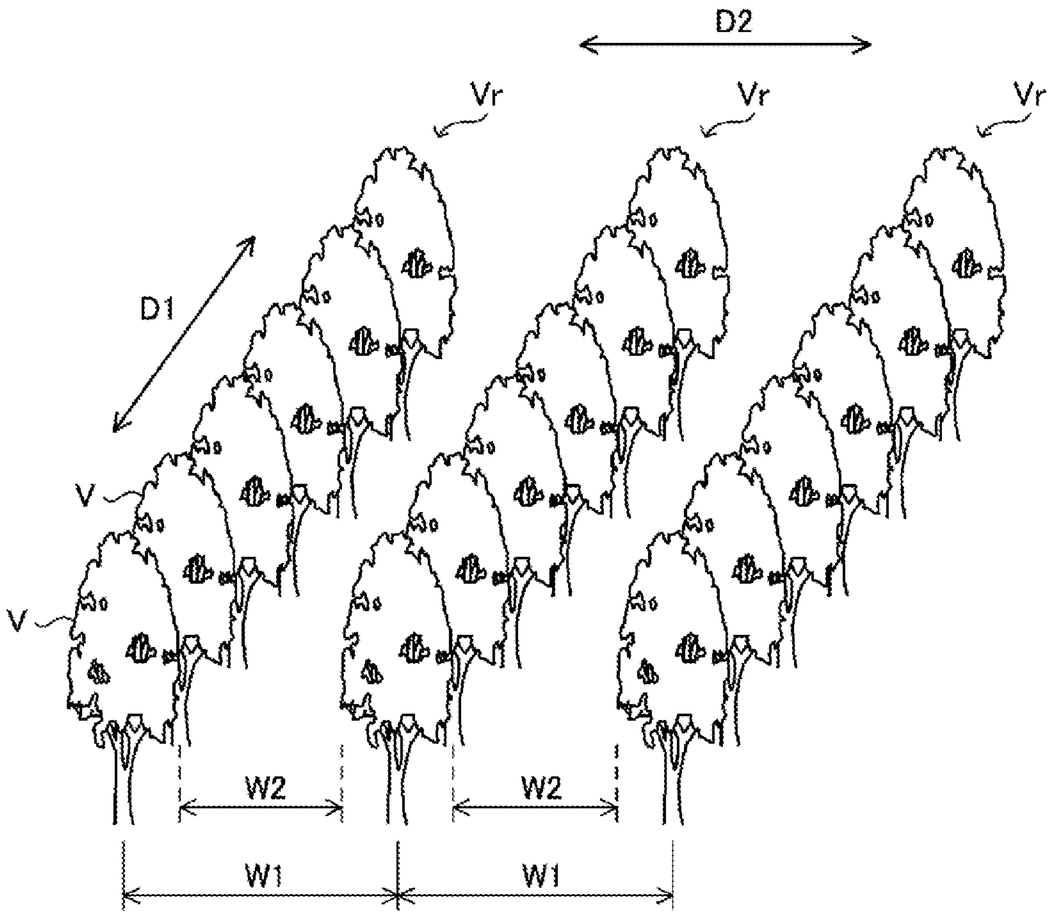
FIG. 5 is a diagram illustrating an example of crop rows according to the embodiment of the present invention.

The crops V are arranged in multiple rows at predetermined intervals in the field F. Specifically, as illustrated in FIG. 5, the multiple crops V are planted in straight lines in a predetermined direction (D1 direction), so as to configure the crop rows Vr that include the multiple crops V arranged in the straight lines. In FIG. 5, an example of three crop rows Vr is illustrated. Each crop row Vr is arranged with the predetermined interval W1 in the row direction (D2 direction). The areas (spaces) of the intervals W2 between adjacent crop rows Vr are the work passages where the work vehicle 10 performs the spraying work on the crops V while traveling in the D1 direction.

Figure 6:
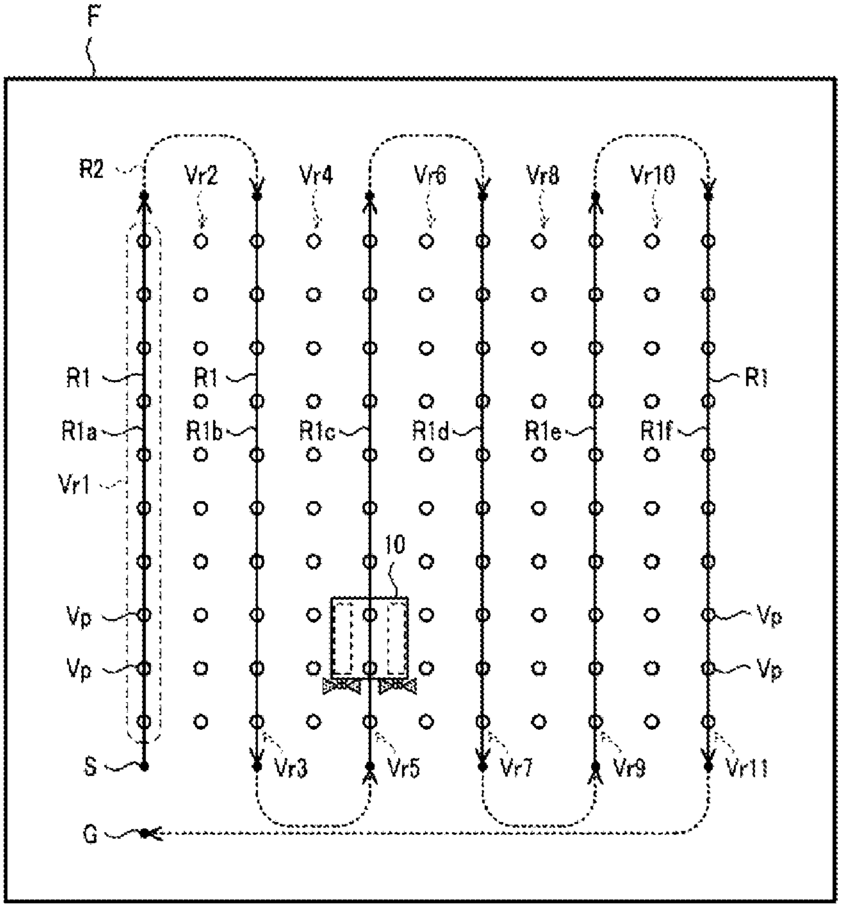
FIG. 6 is a diagram illustrating an example of a target route according to the embodiment of the present invention.

Further, the work vehicle 10 can perform automatic traveling (autonomous traveling) along the preset target route R. For example, as illustrated in FIG. 6, the work vehicle 10 performs automatic traveling along the target route R, which includes the work routes R1 (work routes R1*a* to R1*f*) and the movement routes R2, from the work starting position S to the work ending position G. The work routes R1 are routes of a straight line on which the work vehicle 10 performs the spraying work on the crops V, and the movement routes R2 are routes on which the work vehicle 10 moves between crop rows Vr without performing the spraying work. The movement routes R2 include a turning route and a straight-traveling route, for example. In the example illustrated in FIG. 6, the crops V consisting of the crop rows Vr1 to Vr11 are arranged in the field F. In FIG. 6, the positions where the crops V are planted (crop positions) are indicated by "Vp". Further, the work vehicle 10 traveling in the field F of FIG. 6 has a gate-shaped vehicle body 100 (see FIG. 4C), so as to travel over one crop row Vr and, in the meantime, spray a chemical solution on the crops V of the crop row Vr and on the crop rows Vr adjacent to the crop row Vr. For example, as illustrated in FIG. 6, in a case where the work vehicle 10 travels over the crop row Vr5, the left side vehicle body (left side section 100L) of the work vehicle 10 travels through the work passage between crop rows Vr4 and Vr5, and the right side vehicle body (right side section 100R) of the work vehicle 10 travels through the work passage between the crop rows Vr5 and Vr6, so that a chemical solution is sprayed on the crops V of the crop rows Vr4, Vr5, and Vr6.

Further, the work vehicle 10 performs automatic traveling in a predetermined order of rows. For example, the work vehicle 10 travels over the crop row Vr1, then travels over the crop row Vr3, and then travels over the crop row Vr5. In this way, the work vehicle 10 performs automatic traveling in accordance with a preset order of the crop rows Vr. Note that, in the arrangement order of the crop rows Vr, the work vehicle 10 may travel on each row or may travel on every several rows.

The satellite 50 is a positioning satellite that configures a satellite positioning system such as GNSS (Global Navigation Satellite System) and transmits a GNSS signal (satellite signal). The base station 40 is a reference point (reference station) that configures the satellite positioning system. The base station 40 transmits correction information for calculating the current position of the work vehicle 10 to the work vehicle 10.

The positioning device 16 mounted on the work vehicle 10 executes the positioning processing that calculates the current position (latitude, longitude, and altitude) and current orientation of the work vehicle 10, etc., by use of the GNSS signals transmitted from the satellite 50. Specifically, the positioning device 16 measures the position of the work vehicle 10 by use of an RTK (Real Time Kinematic) method or the like for measuring the position of the work vehicle 10 on the basis of the positioning information (GNSS signal, etc.) which is received by two receivers (the antenna 164 and the base station 40) and the correction information which is generated by the base station 40. The aforementioned positioning method is a well-known technique, and thus the detailed explanation is omitted.

The following is a detailed explanation of each of the constituent elements configuring the automatic traveling system 1.

[Work Vehicle 10]

Figure 3:
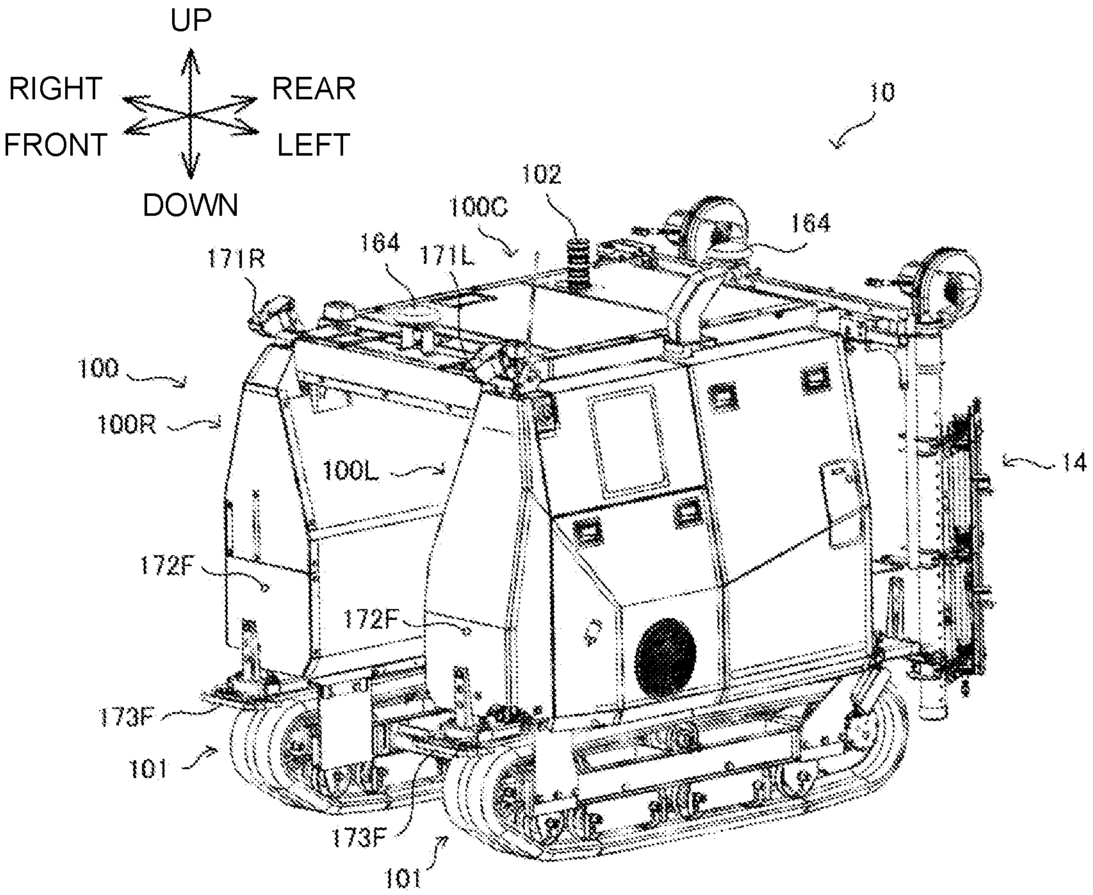
FIG. 3 is an external view of a work vehicle according to the embodiment of the present invention, which is viewed from the left front side.
Figure 4A:
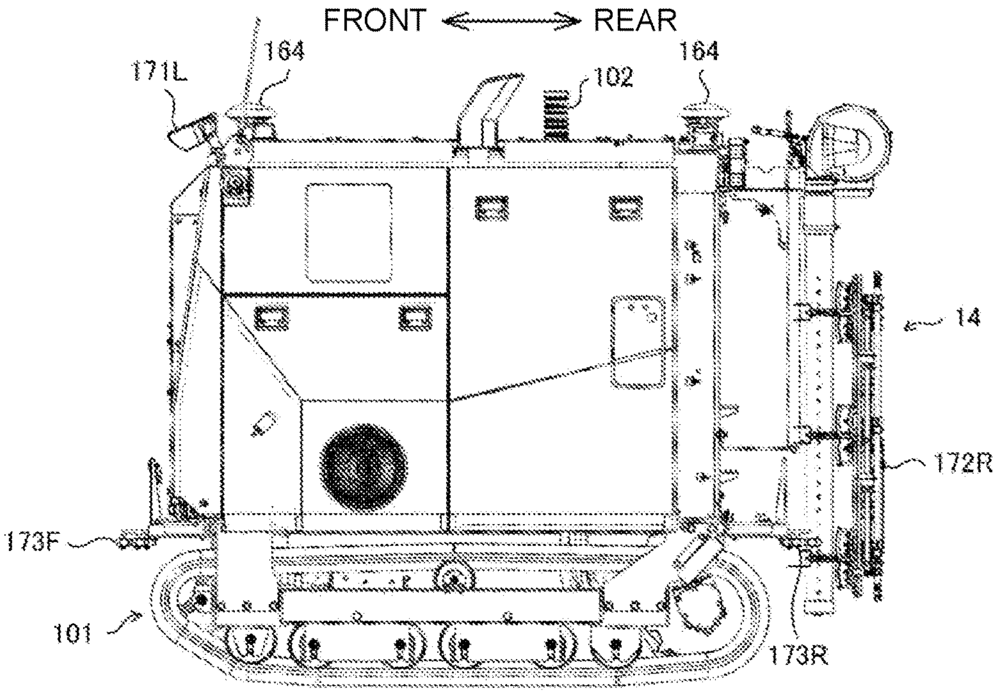
FIG. 4A is an external view of the left side surface of the work vehicle according to the embodiment of the present invention, which is viewed from the left side.
Figure 4B:
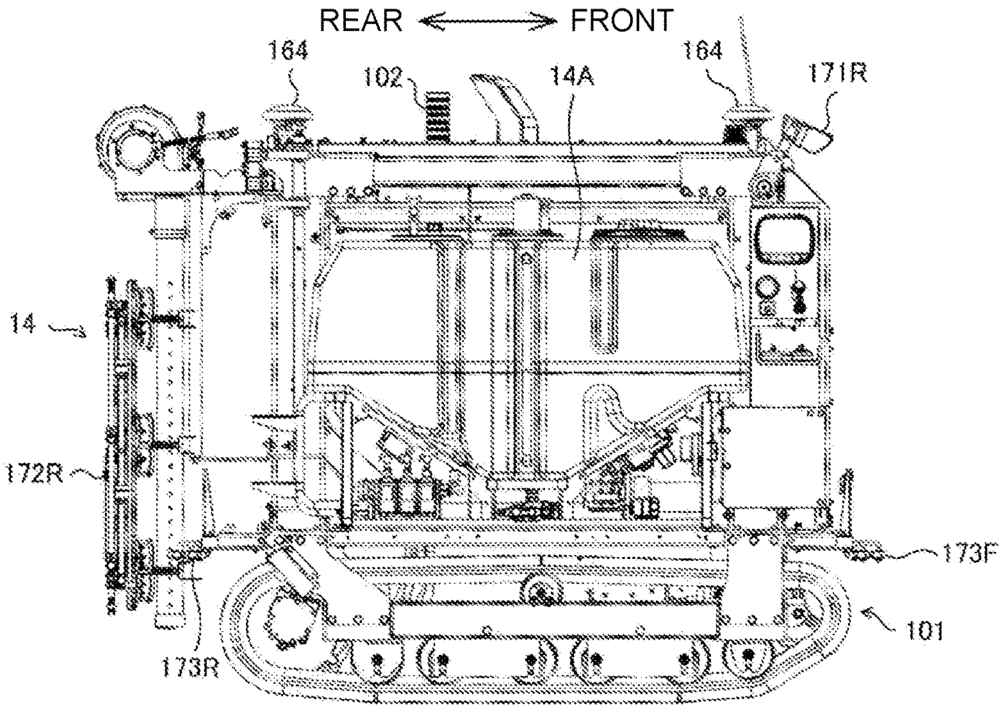
FIG. 4B is an external view of the right side surface of the work vehicle according to the embodiment of the present invention, which is viewed from the right side.
Figure 4C:
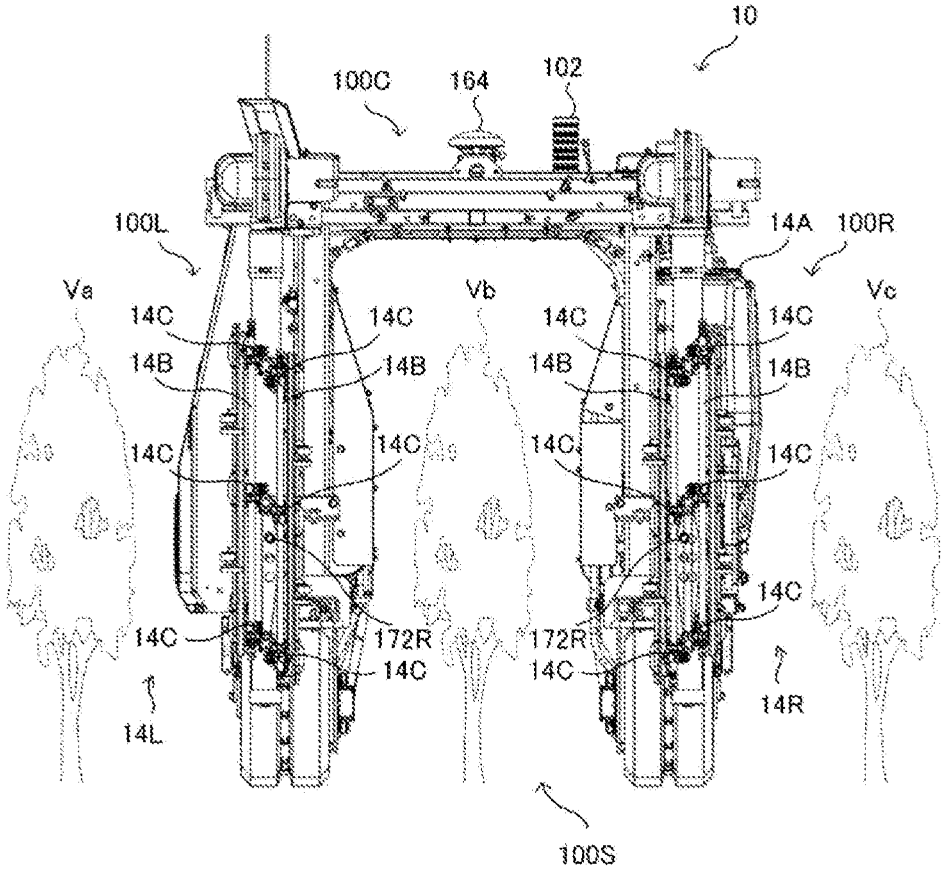
FIG. 4C is an external view of the back surface of the work vehicle according to the embodiment of the present invention, which is viewed from the back surface side.

FIG. 3 is an external view of the work vehicle 10 viewed from the left front side. FIG. 4A is an external view of the left side surface of the work vehicle 10 viewed from the left side, FIG. 4B is an external view of the right side surface of the work vehicle 10 viewed from the right side, and FIG. 4C is an external view of the back surface of the work vehicle 10 viewed from the back surface side.

As illustrated in FIG. 1 to FIG. 4C, the work vehicle 10 includes the vehicle control device 11, the storage part 12, the traveling device 13, the spray device 14, the communication part 15, the positioning device 16, the camera device 17, the obstacle detection device 18, etc. The vehicle control device 11 is electrically connected to the storage part 12, the traveling device 13, the spray device 14, the positioning device 16, the camera device 17, the obstacle detection device 18, etc. Note that the vehicle control device 11 and the positioning device 16 may be capable of wireless communication.

The communication part 15 is a communication interface for connecting the work vehicle 10 to the communication network N1 by wire or wirelessly and for executing data communication according to a predetermined communication protocol with external devices such as the operation terminal 20, the server 30, etc., via the communication network N1.

The storage part 12 is a non-volatile storage part such as an HDD (Hard Disk Drive) or an SSD (Solid State Drive) that stores various kinds of information. The storage part 12 stores control programs such as an automatic traveling program for causing the vehicle control device 11 to execute the later-described automatic traveling processing (see FIG. 10). For example, the aforementioned automatic traveling program is non-transiently recorded on a computer-readable recording medium, such as a CD or a DVD, and is read by a predetermined reading device (not illustrated in the drawings) and stored in the storage part 12. Note that the aforementioned automatic traveling program may be downloaded from a server (for example, the server 30) to the work vehicle 10 via the communication network N1 to be stored in the storage part 12. Further, in the storage part 12, the data of the target route R which is generated in the operation terminal 20 is stored. For example, the data of the target route R is transmitted from the operation terminal 20 to the server 30 and transferred from the server 30 to the work vehicle 10 to be stored in the storage part 12.

The vehicle control device 11 includes control devices such as a CPU, a ROM, and a RAM. The aforementioned CPU is a processor that executes various kinds of arithmetic processing. The aforementioned ROM is a non-volatile storage part in which control programs, such as a BIOS and an OS for causing the aforementioned CPU to execute the various kinds of arithmetic processing, are stored in advance. The aforementioned RAM is a volatile or non-volatile storage part that stores various kinds of information and is used as a transient storage memory (work area) for various kinds of processing to be executed by the aforementioned CPU. Further, the vehicle control device 11 controls the work vehicle 10 with the aforementioned CPU executing various kinds of control programs stored in advance in the aforementioned ROM or the storage part 12.

The vehicle control device 11 controls the traveling of the work vehicle 10. Specifically, the vehicle control device 11 causes the work vehicle 10 to perform automatic traveling along the target route R on the basis of position information indicating the position of the work vehicle 10, which is measured by the positioning device 16. For example, if the aforementioned positioning state becomes capable of RTK positioning and the operator presses the start button on an operation screen of the operation terminal 20, the operation terminal 20 outputs a work starting instruction to the work vehicle 10. If the aforementioned work starting instruction is obtained from the operation terminal 20, the vehicle control device 11 starts automatic traveling of the work vehicle 10 on the basis of the position information indicating the position of the work vehicle 10, which is measured by the positioning device 16. Accordingly, the work vehicle 10 starts automatic traveling along the target route R and starts the spraying work with the spray device 14 in the aforementioned work passages.

Further, the vehicle control device 11 stops the automatic traveling of the work vehicle 10 if a traveling stopping instruction is obtained from the operation terminal 20. For example, if the operator presses the stop button on an operation screen of the operation terminal 20, the operation terminal 20 outputs the aforementioned traveling stopping instruction to the work vehicle 10. If the aforementioned traveling stopping instruction is obtained from the operation terminal 20, the vehicle control device 11 stops the automatic traveling of the work vehicle 10. Accordingly, the work vehicle 10 stops the automatic traveling and stops the spraying work performed by the spray device 14.

The work vehicle 10 includes the gate-shaped vehicle body 100 that travels over the crops V (fruit trees) planted side by side in multiple rows in the field F. As illustrated in FIG. 4C, the vehicle body 100 is formed in a gate-shape with the left side section 100L, the right side section 100R, and the connection section 100C connecting the left side section 100L and right side section 100R, so that the space 100S through which the crops V are allowed to pass is secured inside the left side section 100L, the right side section 100R, and the connection section 100C.

The lower end section of each of the left side section 100L and right side section 100R of the vehicle body 100 is equipped with the crawler 101. The left side section 100L is equipped with an engine (not illustrated in the drawings), a battery (not illustrated in the drawings), etc. The right side section 100R is equipped with the storage tank 14A (see FIG. 4B) of the spray device 14, etc. In this way, by assigning and arranging the constituent elements on the left side section 100L and the right side section 100R of the vehicle body 100, it is attempted that the left-right balance of the work vehicle 10 is equilibrated and the center of gravity thereof is lowered. As a result, the work vehicle 10 can travel stably on slopes or the like in the field F.

The traveling device 13 is a driving part that causes the work vehicle 10 to travel. The traveling device 13 includes an engine, the crawlers 101, etc.

The left and right crawlers 101 are driven by power from the engine in a state of being capable of independent speed change via a hydro-static continuously-variable transmission device. Accordingly, the vehicle body 100 is brought into a forward-traveling state, in which the left and right crawlers 101 are driven at an even speed in the forward-traveling direction so as to travel straight in the forward-traveling direction, and is brought into a backward-traveling state, in which the left and right crawlers 101 are driven at an even speed in the backward-traveling direction so as to travel straight in the backward-traveling direction. Further, the vehicle body 100 is brought into a forward-traveling turning state, in which the left and right crawlers 101 are driven at uneven speeds in the forward-traveling direction so as to make a turn while traveling forward, and is brought into a backward-traveling turning state, in which the left and right crawlers 101 are driven at uneven speeds in the backward-traveling direction so as to make a turn while traveling backward. Further, the vehicle body 100 is brought into a pivot turn state, in which diving of either one of the left and right crawlers 101 is stopped and the other crawler 101 is driven, and is brought into a spin turn state, in which the left and right crawlers 101 are driven at an even speed in the forward-traveling direction and the backward-traveling direction. Further, the vehicle body 100 is brought into the traveling-stopped state by stopping the driving of the left and right crawlers 101. Note that the left and right crawlers 101 may be configured so as to be electrically driven by an electric motor.

As illustrated in FIG. 4C, the spray device 14 includes the storage tank 14A that stores a chemical solution or the like, a spraying pump (not illustrated in the drawings) that pumps the chemical solution or the like, an electric spray motor (not illustrated in the drawings) that drives the spraying pump, the two spray pipes 14B installed in parallel on each of the left and right sides of the back part of the vehicle body 100 in a vertical posture, the total of 12 spray nozzles 14C, three of which are installed for each spray pipe 14B, an electronically-controlled valve unit (not illustrated in the drawings) that changes the spraying amount and the spraying pattern of the chemical solution or the like, multiple spraying pipes (not illustrated in the drawings) that connect these, etc.

Each spray nozzle 14C is attached to the corresponding spray pipe 14B in a vertically-repositionable manner. Accordingly, regarding each spray nozzle 14C, the interval to the adjacent spray nozzles 14C and the height position relative to the spray pipes 14B can be changed according to the spray target objects (crops V). Further, each spray nozzle 14C is attached in such a manner that the height position and left/right position relative to the vehicle body 100 can be changed according to the spray target objects.

Note that, regarding the spray device 14, the number of the spray nozzles 14C installed for each spray pipe 14B can be changed in various ways according to the type of crops V, the length of each spray pipe 14B, etc.

As illustrated in FIG. 4C, of the multiple spray nozzles 14C, the three spray nozzles 14C installed for the leftmost spray pipe 14B spray the chemical solution to the left toward the crop Va which is located on the left outer side of the vehicle body 100. Of the multiple spray nozzles 14C, the three spray nozzles 14C installed for the left inner spray pipe 14B which is adjacent to the leftmost spray pipe 14B spray the chemical solution to the right toward the crop Vb which is located in the space 100S at the center of the vehicle body 100 with respect to the left-right direction. Of the multiple spray nozzles 14C, the three spray nozzles 14C installed for the rightmost spray pipe 14B spray the chemical solution to the right toward the crop Vc which is located on the right outer side of the vehicle body 100. Of the multiple spray nozzles 14C, the three spray nozzles 14C installed for the right inner spray pipe 14B which is adjacent to the rightmost spray pipe 14B spray the chemical solution to the left toward the crop Vb which is located in the space 100S.

With the above-described configuration, in the spray device 14, the two spray pipes 14B and six spray nozzles 14C installed on the left side section 100L of the vehicle body 100 function as the left-side spray part 14L. Further, the two spray pipes 14B and six spray nozzles 14C installed on the right side section 100R of the vehicle body 100 function as the right-side spray part 14R. Further, the left and right spray parts 14L and 14R are arranged on the back part of the vehicle body 100 in the state of being capable of spraying in the left-right directions with a left-right interval that allows the passage of the crop Vb (space 100S) between the left and right spray parts 14L and 14R.

In the spray device 14, the spraying patterns by the spray parts 14L and 14R include the 4-way spraying pattern in which each of the spray parts 14L and 14R sprays the chemical solution in both left and right directions and the direction-limited spraying pattern in which the direction of the spraying by the spray parts 14L and 14R is limited. The aforementioned direction-limited spraying pattern includes the left-side 3-direction spraying pattern in which the spray part 14L sprays the chemical solution in both left and right directions and the spray part 14R sprays the chemical solution only in the left direction, the right-side 3-direction spraying pattern in which the spray part 14L sprays the chemical solution only in the right direction and the spray part 14R sprays the chemical solution in both left and right directions, the 2-way spraying pattern in which the spray part 14L sprays the chemical solution only in the right direction and the spray part 14R sprays the chemical solution only in the left direction, the left-side 1-way spraying pattern in which the spray part 14L sprays only in the left direction and the spray part 14R does not spray the chemical solution, and the right-side 1-way spraying pattern in which the spray part 14R sprays only in the right direction and the spray part 14L does not spray the chemical solution.

Mounted on the vehicle body 100 are an automatic traveling control part that causes the vehicle body 100 to perform automatic traveling according to the target route R in the field F on the basis of positioning information which is obtained from the positioning device 16 or the like, an engine control part that performs the control related to the engine, an HST (Hydro-Static Transmission) control part that performs the control related to the hydro-static continuously-variable transmission device, a work device control part that performs the control related to the work device such as the spray device 14, etc. Each control part is constructed with an electronic control unit equipped with a microcontroller or the like, various kinds of information and control programs stored in a non-volatile memory of the microcontroller (for example, an EEPROM such as a flash memory), etc. The various kinds of information stored in the non-volatile memory may include the target route R that is generated in advance, etc. In the present embodiment, the respective control parts are collectively referred to as the "vehicle control device 11" (see FIG. 2).

The positioning device 16 is a communication device including the positioning control part 161, the storage part 162, the communication part 163, the antennas 164, etc. The antennas 164 are installed in the front and rear of the ceiling part (connection section 100C) of the vehicle body 100 (see FIG. 3). Further, the ceiling part of the vehicle body 100 is also equipped with the indicator light 102 or the like that indicates the traveling state of the work vehicle 10 (see FIG. 3). Note that the aforementioned battery is connected to the positioning device 16, and the positioning device 16 can operate while even the aforementioned engine is stopped.

The communication part 163 is a communication interface for connecting the positioning device 16 to the communication network N1 by wire or wirelessly and for executing data communication according to a predetermined communication protocol with external devices such as the base station 40 via the communication network N1.

The antennas 164 receive radio waves (GNSS signals) transmitted from satellites. Since the antennas 164 are installed in the front and rear of the work vehicle 10, the current position of the work vehicle 10 can be accurately measured.

The positioning control part 161 is a computer system including one or more processors and a storage memory such as a non-volatile memory and a RAM. The storage part 162 is a non-volatile memory or the like that stores control programs for causing the positioning control part 161 to perform the positioning processing as well as data such as positioning information and movement information. The positioning control part 161 measures the current position of the work vehicle 10 by a predetermined positioning method (RTK method, etc.) on the basis of GNSS signals that the antennas 164 receive from the satellite 50.

The obstacle detection device 17 includes the LiDAR sensor 171L installed on the front left side of the vehicle body 100 and the LiDAR sensor 171R installed on the front right side of the vehicle body 100 (see FIG. 3). Each LiDAR sensor measures the distance from the LiDAR sensor to each distance measurement point (object to be measured) in the measurement range by, for example, the TOF (Time Of Flight) method, in which the distance to the distance measurement point is measured on the basis of the round-trip time for a laser light emitted by the LiDAR sensor to return after reaching the distance measurement point.

For the LiDAR sensor 171L, a predetermined range on the front left side of the vehicle body 100 is set as the measurement range, and, for the LiDAR sensor 171R, a predetermined range on the front right side of the vehicle body 100 is set as the measurement range. Each LiDAR sensor transmits measurement information, such as the measured distance to each distance measurement point and the scanning angle (coordinates) to each distance measurement point, to the vehicle control device 11.

Further, the obstacle detection device 17 includes the left and right ultrasonic sensors 172F (see FIG. 3) installed on the front side of the vehicle body 100 and the left and right ultrasonic sensors 172R (see FIG. 4A and FIG. 4B) installed on the rear side of the vehicle body 100. Each ultrasonic sensor measures the distance from the ultrasonic sensor to the object to be measured by the TOF method, in which the distance to the distance measurement point is measured on the basis of the round-trip time for an ultrasonic wave transmitted by the ultrasonic sensor to return after reaching the distance measurement point.

For the ultrasonic sensor 172F on the front left side, a predetermined range on the front left side of the vehicle body 100 is set as the measurement range. For the ultrasonic sensor 172F on the front right side, a predetermined range on the front right side of the vehicle body 100 is set as the measurement range. For the ultrasonic sensor 172R on the rear left side, a predetermined range on the rear left side of the vehicle body 100 is set as the measurement range. For the ultrasonic sensor 172R on the rear right side, a predetermined range on the rear right side of the vehicle body 100 is set as the measurement range. Each ultrasonic sensor transmits the measurement information, which includes the measured distance to the object to be measured and the direction of the object to be measured, to the vehicle control device 11.

Further, the obstacle detection device 17 includes the left and right contact sensors 173F (see FIG. 3) installed on the front side of the vehicle body 100 and the left and right contact sensors 173R (see FIG. 4A and FIG. 4B) installed on the rear side of the vehicle body 100. In a case where an obstacle comes into contact with the contact sensors 173F on the front side of the vehicle body 100, the contact sensors 173F detect the obstacle. The spray device 14 is installed in front of the contact sensors 173R (rear side of the work vehicle 10) on the rear side of the vehicle body 100, and, in a case where an obstacle comes into contact with the spray device 14, the spray device 14 moves to the rear (the front side of the work vehicle 10) and thereby the contact sensors 173R detect the obstacle. Each contact sensor transmits a detection signal to the vehicle control device 11 in a case where an obstacle is detected.

The vehicle control device 11 executes the avoidance processing to avoid obstacles in a case where there is a possibility that the work vehicle 10 will collide with an obstacle, based on measurement information related to the obstacle, which is obtained from the obstacle detection device 17.

With the above-described configurations, it is possible to make the work vehicle 10 perform automatic traveling with high precision along the target route R and properly perform the work of spraying a chemical solution or the like with the spray device 14.

The configurations of the work vehicle 10 described above are a configuration example of the work vehicle of the present invention, and the configurations of the present invention are not limited to those described above. The above-described work vehicle 10 is a vehicle that can perform the spraying work in which a spraying material is sprayed on the aforementioned first crop row Vr as well as the second crop row Vr in each of the left and right directions of the aforementioned first crop row Vr while traveling over the first crop row Vr. As another embodiment, it is also possible that the work vehicle 10 has a normal shape in which the entire vehicle body 100 travels between crop rows Vr (work passage), instead of having the gate-shape of the vehicle body 100. In this case, the work vehicle 10 sequentially performs automatic traveling in each work passage without straddling the crop rows Vr. Further, the spray device 14 includes one spray part and performs the spraying work by switching the spraying patterns among the spraying pattern in which the chemical solution is sprayed in the left and right directions, the spraying pattern in which the chemical solution is sprayed only in the left direction, and the spray pattern in which the chemical solution is sprayed only in the right direction.

[Operation Terminal 20]

As illustrated in FIG. 2, the operation terminal 20 is an information processing apparatus that includes the control part 21, the storage part 22, the operation display part 23, the communication part 24, etc. It is also possible the operation terminal 20 is configured with a portable terminal such as a tablet terminal or a smartphone.

The communication part 24 is a communication interface for connecting the operation terminal 20 to the communication network N1 by wire or wirelessly and for executing data communication according to a predetermined communication protocol with external devices such as one or more work vehicles 10, the server 30, etc., via the communication network N1.

The operation display part 23 is a user interface that includes a display part, such as a liquid crystal display or an organic EL display that displays various kinds of information, and an operation part, such as a touch panel, mouse, or keyboard that accepts operations. On operation screens displayed on the aforementioned display part, the operator can operate the aforementioned operation part to register various kinds of information (the later-described work vehicle information, field information, work information, or the like). Further, the operator can also operate the aforementioned operation part to provide a work starting instruction, traveling stopping instruction, etc., directed to the work vehicle 10. Furthermore, at a location distant from the work vehicle 10, the operator can grasp the traveling state, working situation, and surrounding situation of the work vehicle 10 that is performing automatic traveling in the field F along the target route R, based on the traveling trajectory and image surrounding the vehicle body 100, which are displayed on the operation terminal 20.

The storage part 22 is a non-volatile storage part such as an HDD or an SSD that stores various kinds of information. The storage part 22 stores control programs such as an automatic traveling program for causing the control part 21 to execute the later-described automatic traveling processing (see FIG. 10). For example, the aforementioned automatic traveling program is non-transiently recorded on a computer-readable recording medium, such as a CD or a DVD, and is read by a predetermined reading device (not illustrated in the drawings) to be stored in the storage part 22. Note that the aforementioned automatic traveling program may be downloaded from a server (not illustrated in the drawings) to the operation terminal 20 via the communication network N1 and stored in the storage part 22.

The control part 21 has control devices such as a CPU, a ROM, and a RAM. The aforementioned CPU is a processor that executes various kinds of arithmetic processing. The aforementioned ROM is a non-volatile storage part in which control programs, such as a BIOS and an OS for causing the aforementioned CPU to execute the various kinds of arithmetic processing, are stored in advance. The aforementioned RAM is a volatile or non-volatile storage part that stores various kinds of information and is used as a transient storage memory (work area) for various kinds of processing to be executed by the aforementioned CPU. Further, the control part 21 controls the operation terminal 20 with the aforementioned CPU executing various kinds of control programs stored in advance in the aforementioned ROM or the storage part 22.

As illustrated in FIG. 2, the control part 21 includes various kinds of processing parts such as the setting processing part 211, the generation processing part 212, and the output processing part 213. Note that the control part 21 functions as the aforementioned various kinds of processing parts with the aforementioned CPU executing various kinds of processing according to the aforementioned control programs. Further, a part or all of the aforementioned processing parts may be configured with an electronic circuit. Note that the aforementioned control programs may be programs that cause multiple processors to function as the aforementioned processing parts.

The setting processing part 211 sets and registers information related to the work vehicle 10 (hereinafter referred to as work vehicle information), information related to the field F (hereinafter referred to as field information), and information related to work (here, the spraying work) (hereinafter referred to as work information).

In the setting processing of the aforementioned work vehicle information, by the operator performing operations registered on the operation terminal 20, the setting processing part 211 sets information such as the model of the work vehicle 10, the positions where the antennas 164 are attached in the work vehicle 10, the type of the work machine (here, the spray device 14), the size and shape of the work machine, the position of the work machine relative to the work vehicle 10, the vehicle speed and engine rotational speed during working of the work vehicle 10, and the vehicle speed and engine rotational speed during turning of the work vehicle 10. In the present embodiment, information related to the spray device 14 is set as the information related to the work machine.

In the setting processing of the aforementioned field information, by the operator performing operations registered on the operation terminal 20, the setting processing part 211 sets the information such as the position and shape of the field F, the work starting position S at which the work will be started and the work ending position G at which the work will be ended (see FIG. 6), and the work direction. Note that the work direction means the direction in which the work vehicle 10 is made to travel while performing the spraying work with the spray device 14 in the work area, which is the area of the field F excluding the non-work area such as the headland.

The information of the position and shape of the field F can be obtained automatically, for example, by the operator manually making the work vehicle 10 travel around the field F along the periphery thereof one time and recording the transition of the position information of the antennas 164 at that time. Further, the position and shape of the field F can also be obtained on the basis of a polygon acquired by the operator operating the operation terminal 20 in a state where a map is displayed on the operation terminal 20 to designate multiple points on the map. The area specified by the obtained position and shape of the field F is the area where the work vehicle 10 can be made to travel (travel area).

In the setting processing of the aforementioned work information, the setting processing part 211 is configured to be able to set the number of skips, which is the number of work routes to be skipped in a case where the work vehicle 10 makes a turn in the headland, the width of the headland, etc., as the work information.

The generation processing part 212 generates the target route R, which is a route where the work vehicle 10 is made to perform automatic traveling on the basis of each of the aforementioned setting information. For example, the target route R is a route from the work starting position S to the work ending position G (see FIG. 6). The target route R illustrated in FIG. 6 includes the linear work routes R1 to spray the chemical solution on the crops V in the area where the crops V are planted and the movement routes R2 to move between crop rows Vr without performing the spraying work.

Specifically, the generation processing part 212 generates multiple candidate routes that are candidates for the target route R. First, the generation processing part 212 generates one reference candidate route r1 based on each of the aforementioned setting information and the positions where the crops V are arranged.

An example of the method for generating the reference candidate route r1 will be explained with reference to FIG. 7A to FIG. 7F. In FIG. 7A to FIG. 7F, the crop rows Vr are schematically illustrated. First, the operator manually makes the work vehicle 10 travel along the periphery of the crop rows Vr (see FIG. 7A). The work vehicle 10 detects the edge point E1 on one side (bottom side in FIG. 7A) and the edge point E2 on the other side (top side in FIG. 7A) of each crop row Vr while traveling and obtains position information (coordinates) of the respective edge points E1 and E2. Note that the edge points E1 and E2 may be the locations of already-planted crops V or target locations that indicate the positions of crops V to be planted in the future. The generation processing part 212 obtains position information (coordinates) of the respective edge points E1 and E2 from the work vehicle 10.

Figure 7A:
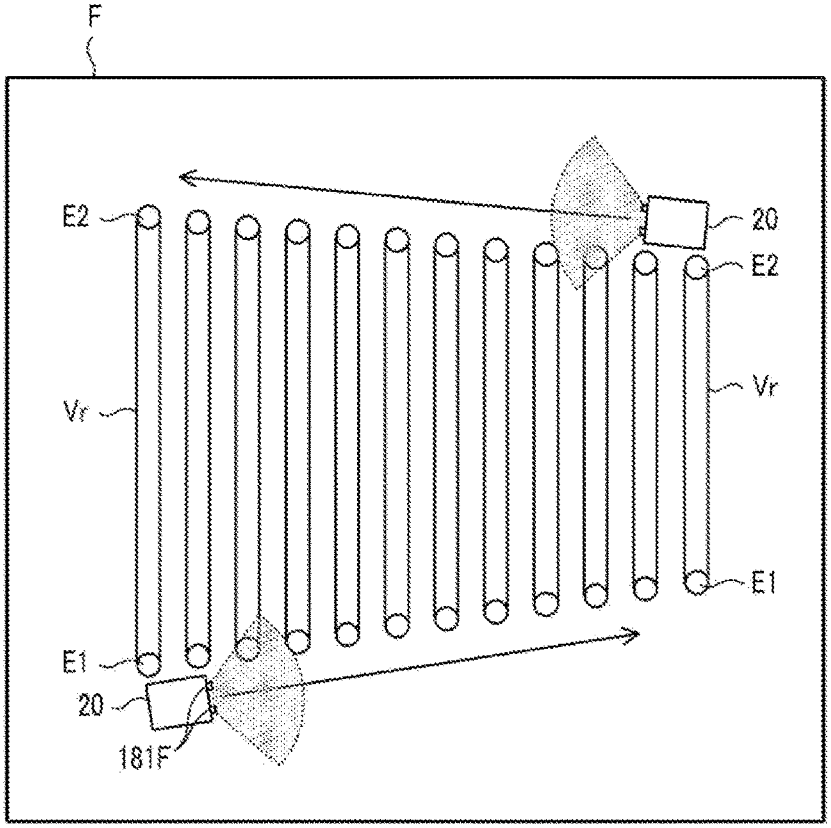
FIG. 7A is a diagram for explaining a method of generating a reference candidate route according to the embodiment of the present invention.
Figure 7B:
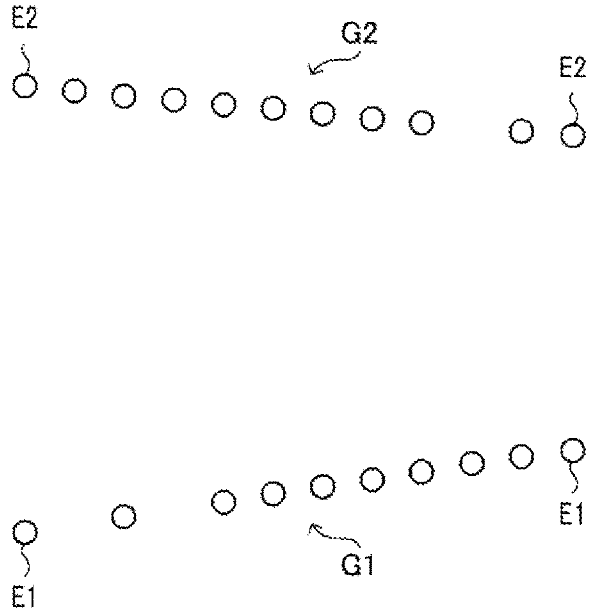
FIG. 7B is a diagram for explaining the method of generating a reference candidate route according to the embodiment of the present invention.
Figure 7C:
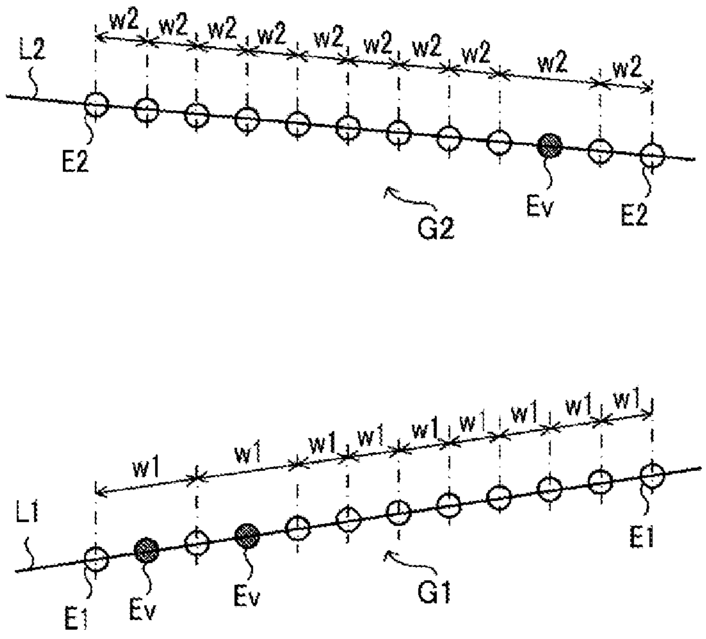
FIG. 7C is a diagram for explaining the method of generating a reference candidate route according to the embodiment of the present invention.

Next, as illustrated in FIG. 7B, the generation processing part 212 groups the multiple edge points E1 as the first group G1 and groups the multiple edge points E2 as the second group G2. Next, as illustrated in FIG. 7C, the generation processing part 212 calculates the interval w1 (row interval) between the edge points E1 included in the first group G1 and the interval w2 (row interval) between the edge points E2 included in the second group G2. Further, the generation processing part 212 generates the straight line L1 connecting all the edge points E1 included in the first group G1 and the straight line L2 connecting all the edge points E2 included in the second group G2 and calculates the respective inclinations of the straight lines L1 and L2. The generation processing part 212 determines whether there is a missing edge point E1 or E2 in each of the first group G1 and the second group G2, based on the row intervals w1 and w2 and the inclinations of the straight lines L1 and L2, and, in a case where there is missing, the generation processing part 212 inserts a virtual point Ev to the missing place, so as to complement the missing edge point E1 or E2. In the example illustrated in FIG. 7C, the two virtual points Ev are inserted in the first group G1 and the one virtual point Ev is inserted in the second group G2.

Figure 7D:
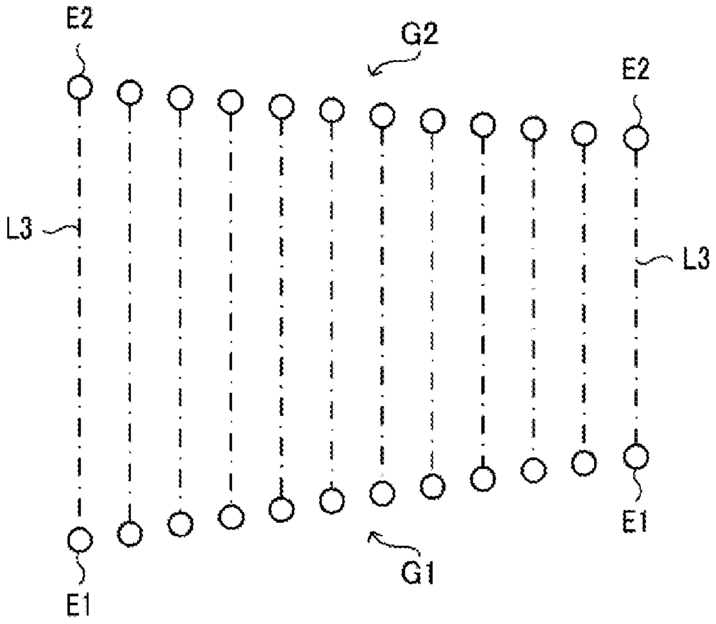
FIG. 7D is a diagram for explaining the method of generating a reference candidate route according to the embodiment of the present invention.
Figure 7E:
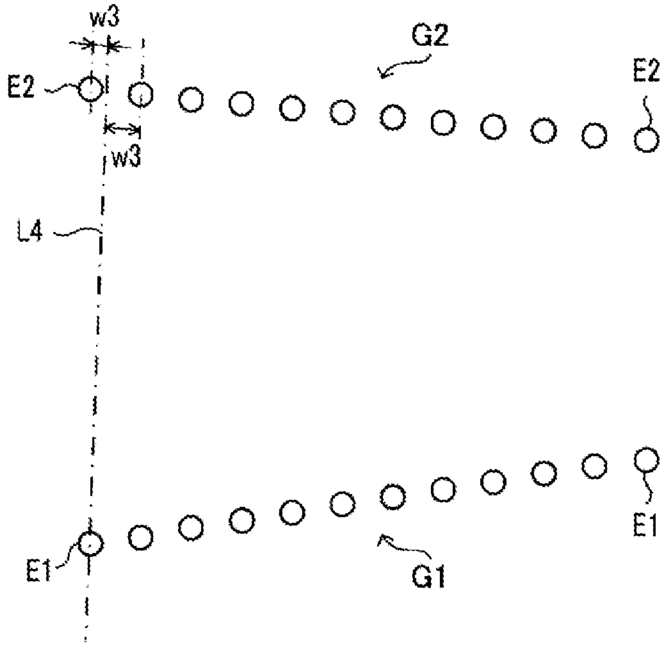
FIG. 7E is a diagram for explaining the method of generating a reference candidate route according to the embodiment of the present invention.

Next, as illustrated in FIG. 7D, the generation processing part 212 generates the straight lines L3 connecting the edge points E1 and E2 facing each other in the respective edge points E1 of the first group G1 and the respective edge points E2 of the second group G2. Next, as illustrated in FIG. 7E, the generation processing part 212 calculates the average inclination of the respective straight lines L3, so as to generate the reference line L4 having the calculated inclination. Next, the generation processing part 212 executes the first pairing process, in which the respective edge points E2 of the second group G2 are paired with the respective edge points E1 of the first group G1, and the second pairing process, in which the respective edge points E1 of the first group G1 are paired with the respective edge points E2 of the second group G2.

Figure 7F:
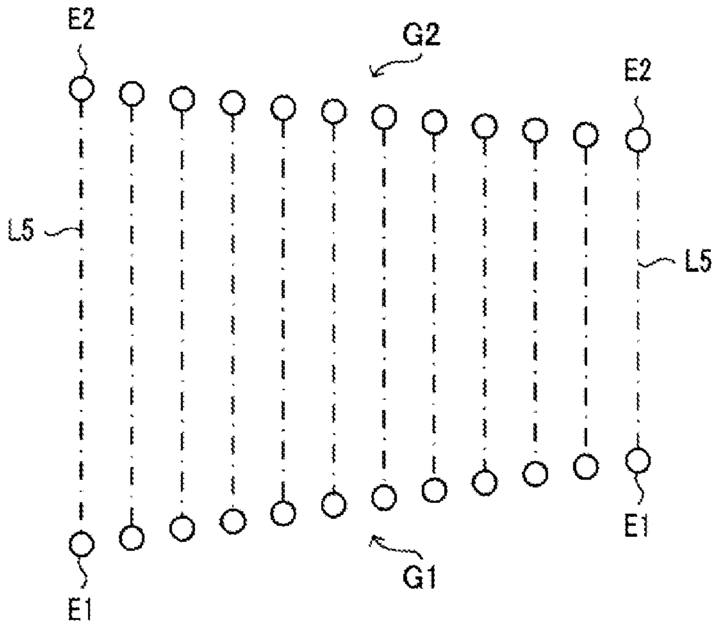
FIG. 7F is a diagram for explaining the method of generating a reference candidate route according to the embodiment of the present invention.

Specifically, as illustrated in FIG. 7E, the generation processing part 212 generates the reference line L4 whose origin is a given edge point E1 of the first group G1, extracts multiple edge points E2 of the second group G2 existing within a reference value from the reference line L4, and pairs the edge point E2 whose distance w3 to the reference line L4 is the shortest among the extracted multiple edge points E2 with the edge point E1 that is the origin of the reference line L4. The generation processing part 212 executes the first pairing process to all the edge points E1 of the first group G1. Further, in the second pairing process, the generation processing part 212 sets each of the edge points E2 of the second group G2 as the origin, so as to execute the same process as the first pairing process to all the edge points E2 of the second group G2. After executing the first pairing process and the second pairing process, the generation processing part 212 determines whether or not the pairing results of the respective pairing processes are the same and determines that the pairing is successful in a case where the pairing results are the same. If pairing is successful, the generation processing part 212 generates the straight lines L5 connecting the paired edge points E1 and E2 as the reference candidate routes r1, as illustrated in FIG. 7F.

In this way, the generation processing part 212 generates the reference candidate routes r1 by connecting both edge points E1 and E2 of each crop row Vr. The method for generating the reference candidate routes r1 is not limited to the method described above.

Figures 8, 9:
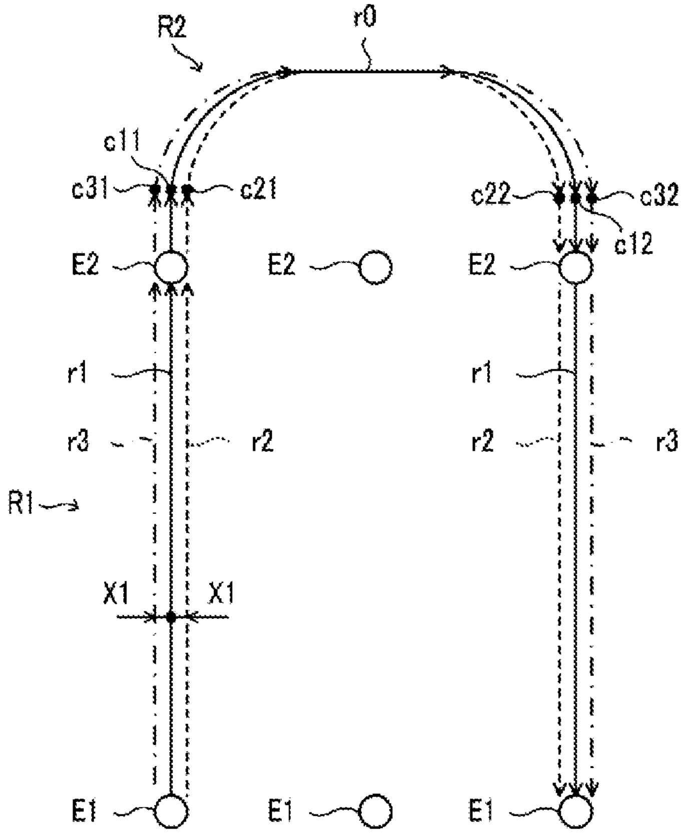
FIG. 8 is a diagram illustrating an example of a candidate route according to the embodiment of the present invention.
FIG. 9 is a diagram illustrating an example of route information according to the embodiment of the present invention.

After the reference candidate routes r1 are generated, the generation processing part 212 generates other candidate routes based on the reference candidate routes r1. Specifically, the generation processing part 212 generates other candidate routes by offsetting of a predetermined distance from the reference candidate routes r1. For example, as illustrated in FIG. 8, the generation processing part 212 generates the candidate routes r2, which are offset from the reference candidate routes r1 by X1 (cm) in the right direction, and the candidate routes r3, which are offset from the reference candidate routes r1 by X1 (cm) in the left direction. The aforementioned predetermined distance is a value within a preset tolerance range and is set based on at least one of the respective types and sizes of the work vehicle 10 and work machine (spray device 14), the intervals W1 of the crop rows Vr (see FIG. 5), the intervals W2 of the work passages (see FIG. 5), and the inclination angles of the field F. Further, the aforementioned tolerance range is set based on the respective types and sizes of the work vehicle 10 and work machine (spray device 14), the intervals W1 of the crop rows Vr, the intervals W2 of the work passages, the inclination angles of the field F, etc. For example, in a case where the aforementioned tolerance range is set to ±5 cm, the generation processing part 212 sets the offset amount of ±5 cm for the reference candidate routes r1. That is, the generation processing part 212 generates the candidate routes r2, which are offset from the reference candidate routes r1 by 5 cm in the right direction, and the candidate routes r3, which are offset from the reference candidate routes r1 by 5 cm in the left direction. Note that the offset amount in the right direction (+ direction) and the offset amount in the left direction (− direction) may be set to different values, respectively.

Further, the aforementioned predetermined distance may be set by use of a random number within the aforementioned tolerance range. For example, the generation processing part 212 generates a random value which is normalized within the range of −1.0 to +1.0 and sets the value calculated in multiplying the maximum value (in the aforementioned example, 5 cm) of the aforementioned tolerance range by the generated random number as the aforementioned predetermined distance. In this way, the generation processing part 212 may set a random offset amount by use of a random number each time of setting the offset amount.

In a case where the reference candidate routes r1 are set as the target route R, the work vehicle 10 performs automatic traveling on the route indicated by the solid line in FIG. 8, and, in a case where the candidate routes r2 are set as the target route R, the work vehicle 10 performs automatic traveling on the route indicated by the dotted line in FIG. 8, and, in a case where the candidate routes r3 are set as the target route R, the work vehicle 10 performs automatic traveling on the route indicated by the dashed-dotted line in FIG. 8.

Further, as illustrated in FIG. 8, it is also possible that the turning start position c11 of the turning route included in the movement route R2 (route of the solid line in FIG. 8) connected to the reference candidate route r1 which is to be the work route R1, the turning start position c21 of the turning route included in the movement route R2 (route of the dotted line in FIG. 8) connected to the candidate route r2 which is to be the work route R1, and the turning start position c31 of the turning route included in the movement route R2 (route of the dashed-dotted line in FIG. 8) connected to the candidate route r3 which is to be the work route R1 are set by the generation processing part 212 as positions different from each other. Similarly, it is also possible that the turning end position c12 of the turning route included in the movement route R2 (route of the solid line in FIG. 8) connected to the reference candidate route r1 which is to be the work route R1, the turning end position c22 of the turning route included in the movement route R2 (route of the dotted line in FIG. 8) connected to the candidate route r2 which is to be the work route R1, and the turning end position c32 of the turning route included in the movement route R2 (route of the dashed-dotted line in FIG. 8) connected to the candidate route r3 which is to be the work route R1 are set by the generation processing part 212 as positions different from each other. Accordingly, it is possible for the work vehicle 10 to perform the work during the automatic traveling without damaging the topsoil of the work site in the vicinity of edge points of the crop rows Vr.

Further, as illustrated in FIG. 8, it is also possible that the straight route r0 included in the movement route R2 (route of the solid line in FIG. 8) connected to the reference candidate route r1 which is to be the work route R1, the straight route r0 included in the movement route R2 (route of the dotted line in FIG. 8) connected to the candidate route r2 which is to be the work route R1, and the straight route r0 included in the movement route R2 (route of the dashed-dotted line in FIG. 8) connected to the candidate route r3 which is to be the work route R1 are set by the generation processing part 212 as a common route at the same position. In the movement route R2, the work vehicle 10 can travel on the common route without any problem in damaging the topsoil since the work vehicle 10 travels in the area where the crops V are not planted. Accordingly, it is possible for the operator to grasp the position where the work vehicle 10 will travel during a turn-traveling, which can improve the safety.

Note that the control part 21 may display information of the candidate routes r1 to r3 illustrated in FIG. 8 on the operation terminal 20. For example, the control part 21 displays each of the candidate routes r1 to r3 on the operation terminal 20 in display manners that are different from each other. Accordingly, it is possible for the operator to easily grasp the candidate routes r1 to r3 on the operation terminal 20. Further, it is also possible that, of the candidate routes r1 to r3, the control part 21 displays the travel route where the work vehicle 10 traveled in the previous time in a visually-recognizable manner. Accordingly, it is possible for the operator to easily grasp the travel route where the work vehicle 10 traveled in the previous time and the candidate route that should be selected this time on the operation terminal 20.

As described above, the generation processing part 212 generates multiple candidate routes that are the candidates for the target route R. In the aforementioned example, the generation processing part 212 generates the reference candidate routes r1 and the candidate routes r2 and r3. The generation processing part 212 may store the generated multiple candidate routes in the storage part 22.

The output processing part 213 outputs the multiple candidate routes generated by the generation processing part 212 to the server 30. In the aforementioned example, the output processing part 213 outputs the route data of the candidate routes including the reference candidate routes r1 and the candidate routes r2 and r3 to the server 30. Note that the output processing part 213 may output the route data of the aforementioned multiple candidate routes to the work vehicle 10.

In addition to the processing described above, the control part 21 executes the processing of displaying various kinds of information on the operation display part 23. For example, the control part 21 displays the registration screen for registering work vehicle information, field information, work information, etc., the operation screen for generating candidate routes, the operation screen for causing the work vehicle 10 to start automatic traveling, the display screen for displaying the traveling state of the work vehicle 10 or the like, etc., on the operation display part 23.

Further, the control part 21 accepts various kinds of operations from the operator. Specifically, the control part 21 accepts the work starting instruction for causing the work vehicle 10 to start working, the traveling stopping instruction for stopping the traveling of the work vehicle 10 during the automatic traveling, etc., from the operator. Upon accepting each of the aforementioned instructions, the control part 21 outputs each of the aforementioned instructions to the work vehicle 10.

Upon obtaining the work starting instruction from the operation terminal 20, the vehicle control device 11 of the work vehicle 10 starts automatic traveling and the working of the work vehicle 10. Further, upon obtaining the traveling stopping instruction from the operation terminal 20, the vehicle control device 11 stops the automatic traveling and the working of the work vehicle 10.

Note that the operation terminal 20 may be able to access a website of an agricultural support service provided by the server 30 (agricultural support site) via the communication network N1. In this case, with the control part 21 executing a browser program, the operation terminal 20 can function as a terminal for operating the server 30.

[Server 30]

As illustrated in FIG. 2, the server 30 is a server device including the control part 31, the storage part 32, the operation display part 33, the communication part 34, etc. Note that the server 30 is not limited to a single computer but may be a computer system that operates with multiple computers working together. Further, the various kinds of processing executed by the server 30 may be distributed and executed by one or more processors.

The communication part 34 is a communication interface for connecting the server 30 to the communication network N1 by wire or wirelessly and for executing data communication according to a predetermined communication protocol with external devices such as one or more work vehicles 10, one or more operation terminals 20, etc., via the communication network N1.

The operation display part 33 is a user interface that includes a display part, such as a liquid crystal display or an organic EL display that displays various kinds of information, and an operation part, such as a touch panel, mouse, or keyboard that accepts operations.

The storage part 32 is a non-volatile storage part such as an HDD or an SSD that stores various kinds of information. The storage part 32 stores control programs such as an automatic traveling program for causing the control part 31 to execute the later-described automatic traveling processing (see FIG. 10). For example, the aforementioned automatic traveling program is non-transiently recorded on a computer-readable recording medium, such as a CD or a DVD, and is read by a predetermined reading device (not illustrated in the drawings) to be stored in the storage part 32. Note that the aforementioned automatic traveling program may be downloaded from another server (not illustrated in the drawings) to the server 30 via the communication network N1 and stored in the storage part 32.

Further, the storage part 32 also stores the route information D1 of the candidate routes that are output from the operation terminal 20. In FIG. 9, the positions of the route information D1 are illustrated. The route information D1 includes information such as the "route ID," "candidate route name," and "offset amount" corresponding to each candidate route. The aforementioned route IDs are identification information of the candidate routes and the aforementioned candidate route names are the names of the candidate routes. The aforementioned offset amounts are information indicating the offset amounts relative to the reference candidate route r1. In FIG. 9, the information related to the reference candidate route r1 (CANDIDATE ROUTE ID: "r001), the candidate route r2 (CANDIDATE ROUTE ID: "r002), and the candidate route r3 (CANDI- DATE ROUTE ID: "r003") is registered. The route data of the respective candidate routes is stored in the storage part 32 in association with the aforementioned route IDs.

Note that the storage part 32 may store the corresponding route information D1 for each work vehicle 10. For example, it is also possible that the route information D1 corresponding to the work vehicle 10A and the route information D1 corresponding to the work vehicle 10B are stored in the storage part 32.

The control part 31 includes control devices such as a CPU, a ROM, and a RAM. The aforementioned CPU is a processor that executes various kinds of arithmetic processing. The aforementioned ROM is a non-volatile storage part in which control programs, such as a BIOS and an OS for causing the aforementioned CPU to execute the various kinds of arithmetic processing, are stored in advance. The aforementioned RAM is a volatile or non-volatile storage part that stores various kinds of information and is used as a transient storage memory (work area) for various kinds of processing to be executed by the aforementioned CPU. Further, the control part 31 controls the server 30 with the aforementioned CPU executing various kinds of control programs stored in advance in the aforementioned ROM or the storage part 32.

As illustrated in FIG. 2, the control part 31 includes various kinds of processing parts such as the obtainment processing part 311, the determination processing part 312, the transfer processing part 313, etc. Note that the control part 31 functions as the aforementioned various kinds of processing parts with the aforementioned CPU executing various kinds of processing according to the aforementioned control programs. Further, a part or all of the aforementioned processing parts may be configured with an electronic circuit. Note that the aforementioned control programs may be programs that cause multiple processors to function as the aforementioned processing parts.

The obtainment processing part 311 obtains various kinds of information from the work vehicle 10 and the operation terminal 20. For example, the obtainment processing part 311 obtains user information, field information, work schedule information, candidate route information, etc., from the operation terminal 20. Further, the obtainment processing part 311 obtains information such as work performance from the work vehicle 10. For example, if the route data of the aforementioned candidate routes is obtained from the operation terminal 20, the obtainment processing part 311 stores the route information D1 (see FIG. 9) and the route data related to the aforementioned candidate routes in the storage part 32.

The determination processing part 312 determines the target route R on which the work vehicle 10 is made to perform automatic traveling. Specifically, the determination processing part 312 determines the candidate route (the first candidate route of the present invention) selected from among the multiple candidate routes as the target route R.

For example, the determination processing part 312 selects a candidate route that is different from the candidate route selected in the previous work and determines the selected candidate route as the target route R. For example, in a case where the work vehicle 10 performed automatic traveling and the spraying work with the candidate route r1 being set as the target route R in the previous work, the determination processing part 312 determines the candidate route r2 or the candidate route r3, which is selected from among the multiple candidate routes r1 to r3 that are registered in the route information D1, as the target route R in the current work. Here, in a case where the determination processing part 312 selects the candidate route r2 in the current work, the determination processing part 312 will select and determine the candidate route r1 or the candidate route r3 as the target route R in the next work.

In this way, each time of work, the determination processing part 312 randomly selects and determines a candidate route that is different from the candidate route selected in the previous work from among the multiple candidate routes as the target route R.

As another embodiment, it is also possible that the determination processing part 312 determines a candidate route that is selected by the user (operator) as the target route R. For example, if the operator selects a desired candidate route from among the candidate routes r1 to r3 on the operation terminal 20, the determination processing part 312 determines the candidate route that is selected by the operator as the target route R. Note that it is also possible that the operation terminal 20 displays the information (traveling performance) of the target routes R in the past (for example, the previous time) on the screen of selecting a candidate route. Accordingly, it is possible for the operator to grasp the routes where the work vehicle 10 traveled during the work in the past such as in the previous work. Further, it is also possible for the determination processing part 312 to accept a user operation of selection from among the candidate routes excluding the candidate route that was selected in the previous work. Further, it is also possible that, based on the traveling performance in the past, the determination processing part 312 displays candidate routes with low traveling frequency on the selection screen in a prioritized manner from among the multiple candidate routes or displays the multiple candidate routes in ascending order of traveling frequency.

As another embodiment, it is also possible that the determination processing part 312 determines the candidate route that is selected based on the state of the topsoil (soil) of the field F as the target route R. For example, the work vehicle 10 includes a camera (not illustrated in the drawings), so that the determination processing part 312 selects the candidate route of the current work, based on an image of the topsoil that is captured by the camera in the previous work. For example, in a case where it is determined that the topsoil of the candidate route r2 is damaged (rough) as a result of analysis of the aforementioned image, the determination processing part 312 selects and determines the candidate route r1 or the candidate route r3 as the target route R in the current work. Further, for example, in a case where it is determined that the topsoil of the candidate route r3 is damaged as a result of analysis of the aforementioned image, the determination processing part 312 selects and determines the candidate route r1 or the candidate route r2 as the target route R in the current work. Further, it is also possible that the determination processing part 312 selects and determines a candidate route as the target route R, based on the information of the candidate route that was selected in the previous work and the current state of the topsoil. The work vehicle 10 according to the aforementioned embodiment may be equipped with the obstacle detection device 17 and the aforementioned camera.

As described above, the first candidate route of the present invention may be a candidate route that is different from the candidate route selected in the previous work, a candidate route selected by the user, or a candidate route selected based on the state of the topsoil of the field F.

Note that it is also possible that the determination processing part 312 executes the process of determining the target route R in a case where an instruction for starting automatic traveling (work starting instruction) is obtained from the operation terminal 20.

The transfer processing part 313 transfers the route data of the target route R (see FIG. 6) determined by the determination processing part 312 to the work vehicle 10. The work vehicle 10 stores the route data of the target route R transferred from the server 30 in the storage part 12. The work vehicle 10 performs automatic traveling along the target route R while measuring the current position of the work vehicle 10 with the positioning device 16.

Here, the work vehicle 10 is configured to be able to perform automatic traveling in a case where the current position is in the field F and is configured to be unable to perform automatic traveling in a case where the current position is outside the field F (such as on a public road). Further, the work vehicle 10 is configured to be able to perform automatic traveling in a case where the current position matches the work starting position S, for example.

In a case where the current position matches the work starting position S, if the start button on the operation terminal 20 is pressed by the operator so that the work starting instruction is provided, the work vehicle 10 will start automatic traveling with the vehicle control device 11 and start the spraying work with the spray device 14. That is, the work vehicle 10 allows automatic traveling on the condition that the current position matches the work starting position S. Note that the condition for allowing automatic traveling of the work vehicle 10 is not limited to the aforementioned condition.

The vehicle control device 11 causes the work vehicle 10 to perform automatic traveling from the work starting position S to the work ending position G, based on the target route R obtained from the server 30. Further, it is also possible that, if the work vehicle 10 ends the work, the vehicle control device 11 causes the work vehicle 10 to perform automatic traveling from the work ending position G to the entrance of the field F. In a case where the work vehicle 10 is performing automatic traveling, the operation terminal 20 can display the state (position, traveling speed, work situation, etc.) of the work vehicle 10, which is received from the work vehicle 10, on the operation display part 23.

As another embodiment, it is also possible that the control part 31 of the server 30 generates the aforementioned reference candidate route and generates other candidate routes based on the aforementioned reference candidate route. That is, it is also possible that the control part 31 includes the function of the generation processing part 212 of the operation terminal 20. Further, as another embodiment, it is also possible that the control part 21 of the operation terminal 20 generates the aforementioned reference candidate route and the control part 31 of the server 30 generates other candidate routes.

As another embodiment, it is also possible that, in a case of a configuration in which the operation terminal 20 outputs the route data of the aforementioned multiple candidate routes to the work vehicle 10, the vehicle control device 11 of the work vehicle 10 determines the candidate route selected from among the aforementioned multiple candidate routes as the target route R. That is, it is also possible that the vehicle control device 11 includes the function of the determination processing part 312 of the server 30. In this case, if the work starting instruction is obtained from the operation terminal 20, the vehicle control device 11 will determine the candidate route selected from among the aforementioned multiple candidate routes as the target route R and start automatic traveling along the determined target route R.

[Automatics Traveling Processing]

Figure 10:
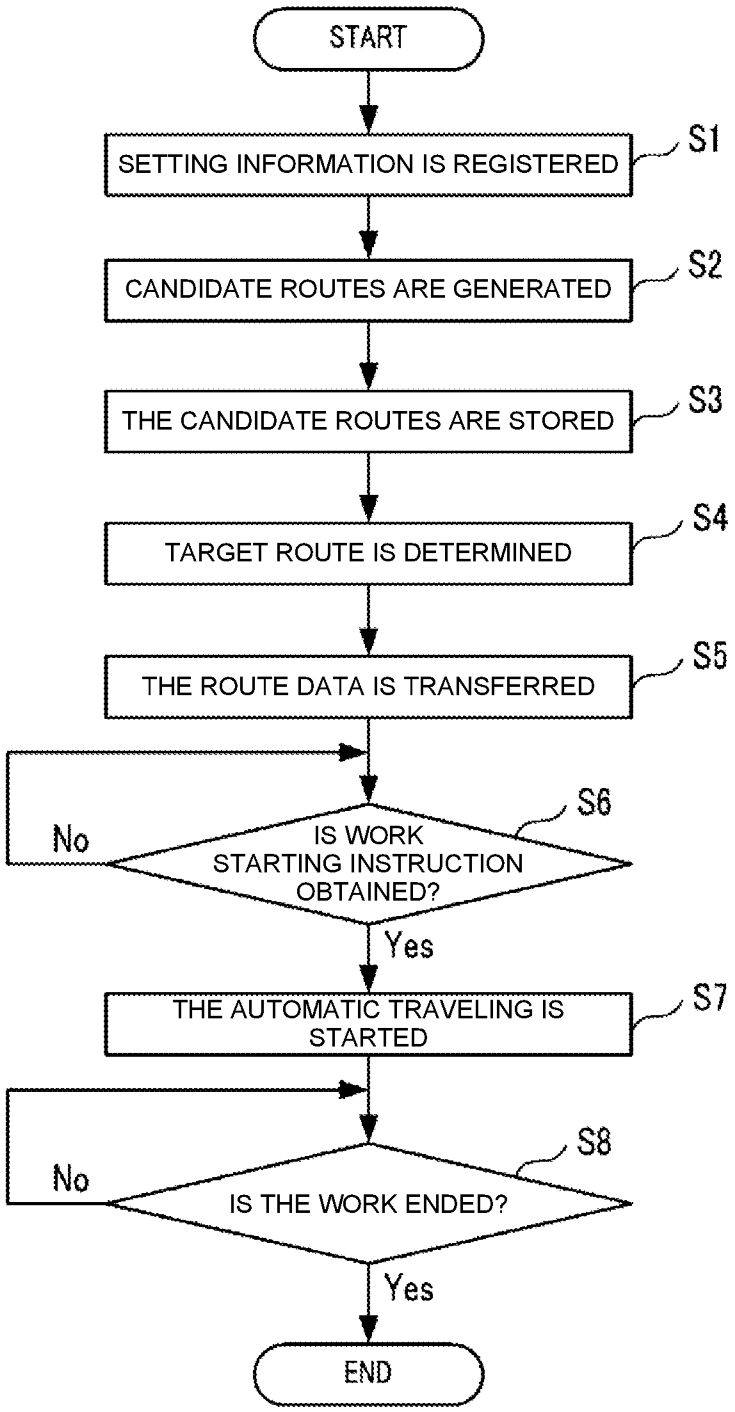
FIG. 10 is a flowchart illustrating an example of a procedure of automatic traveling processing executed by the automatic traveling system according to the embodiment of the present invention.

In the following, with reference to FIG. 10, an explanation will be given of an example of the aforementioned automatic traveling processing to be executed by the vehicle control device 11 of the work vehicle 10, the control part 21 of the operation terminal 20, and the control part 31 of the server 30.

Note that the present invention can be recognized as an invention of an automatic traveling method, in which one or more steps included in the aforementioned automatic traveling processing are executed. Further, it is also possible to omit one or more steps included in the herein-explained aforementioned automatic traveling processing as appropriate. Note that each step in the aforementioned automatic traveling processing may be executed in a different order as long as the same functional effect is obtained. Further, although the case in which the vehicle control device 11, the control part 21, and the control part 31 execute each step in the aforementioned automatic traveling processing is taken as an example for the explanation, such an automatic traveling method in which the respective steps in the automatic traveling processing are distributed and executed by one or more processers can be considered as another embodiment. Further, the aforementioned automatic traveling method includes the route determination method of the present invention.

In Step S1, the control part 21 of the operation terminal 20 registers various kinds of setting information. Specifically, the control part 21 sets and registers information related to the work vehicle 10 (work vehicle information), information related to the field F (field information), and information related to the work (work information), based on the operator's setting operations.

Next, in Step S2, the control part 21 generates candidate routes to be the candidates for the target route R, based on each of the aforementioned setting information. For example, the control part 21 generates one reference candidate route r1, based on the positions where the crops V are arranged in the field F (see FIG. 7A to FIG. 7F), and generates other candidate routes r2 and r3 by offsetting of a predetermined distance (+X1, —X1) from the reference candidate route r1 (see FIG. 8). The control part 21 outputs the route data of the generated multiple candidate routes r1 to r3 to the server 30.

Next, in Step S3, if the route data that is output from the operation terminal 20 is obtained, the control part 31 of the server 30 stores the route information D1 (see FIG. 9) and the route data related to the candidate routes r1 to r3 in the storage part 32.

In Step S4, the control part 31 selects and determines a candidate route that is selected from the multiple candidate routes (see FIG. 8 and FIG. 9) as the target route R. Specifically, the control part 31 selects a candidate route that is different from the candidate route selected in the previous work and determines the selected candidate route as the target route R. Further, it is also possible that the control part 31 determines the candidate route selected by the operator as the target route R. Further, it is also possible that the control part 31 determines the candidate route selected based on the state of the topsoil of the field F as the target route R.

Next, in Step S5, the control part 31 transfers the route data of the determined target route R to the work vehicle 10.

Next, in Step S6, the vehicle control device 11 of the work vehicle 10 determines whether or not the work starting instruction has been obtained from the operation terminal 20. For example, if the operator presses the start button on the operation terminal 20, the operation terminal 20 outputs the work starting instruction to the work vehicle 10. If the vehicle control device 11 obtains the work starting instruction from the operation terminal 20 (S6: Yes), the processing proceeds to Step S7. The vehicle control device 11 stands by until obtaining the work starting instruction from the operation terminal 20 (S6: No).

Next, in Step S7, if the work starting instruction is obtained from the operation terminal 20 and the route data that is transferred from the server 30 is obtained, the vehicle control device 11 starts automatic traveling along the target route R according to the route data. Note that the vehicle control device 11 stores the aforementioned route data that is obtained from the server 30 in the storage part 12. Accordingly, as illustrated in FIG. 6 for example, the work vehicle 10 starts automatic traveling from the work starting position S to perform the automatic traveling up to the work ending position G while spraying the chemical solution on the crops V of the crop rows Vr1 to Vr11 along the target route R.

Next, in Step S8, the vehicle control device 11 determines whether or not the work vehicle 10 has ended the work. The vehicle control device 11 determines that the work has been ended in a case where the position of the work vehicle 10 matches the work ending position G. In a case where the work vehicle 10 has ended the work (S8: Yes), the aforementioned automatic traveling processing ends. Until the work vehicle 10 ends the work, the vehicle control device 11 repeats the process of Step S8 and continues the automatic traveling.

Note that it is also possible that the processes of Steps S1 to S4 and Steps S5 to S8 are executed independently. For example, the automatic traveling system 1 executes the processes of Steps S1 to S4 in the stage of initial setup when the work vehicle 10 is introduced. Further, the automatic traveling system 1 executes the processes of Steps S5 to S8 when the operator performs working with the work vehicle 10.

As explained above, the automatic traveling system 1 according to the present embodiment generates multiple candidate routes which are the candidates for the target route R, on which the work vehicle 10 that performs automatic traveling in a predetermined order of rows while performing predetermined work (for example, the spraying work) on work target objects (for example, the crops V) arranged in multiple rows in the work site (for example, the field F) is caused to travel, and determines the first candidate route, which is selected from among the generated multiple candidate routes, as the target route R. Further, in the automatic traveling method (route determination method) according to the present embodiment, one or more processors execute generating (generation process) of multiple candidate routes, which are the candidates for the target route R on which the work vehicle 10 is caused to perform automatic traveling in a predetermined order of rows while performing a predetermined work (for example, the spraying work) on work target objects (for example, the crops V) arranged in multiple rows in the work site (for example, the field F), and determining (determination process) of the first candidate route which is selected from among the generated multiple candidate routes as the target route R.

According to the above-described configuration, since the target route R on which the work vehicle 10 is caused to travel is selected from among the multiple candidate routes, it is possible to cause the work vehicle 10 to travel in a place that is different from the place where the work vehicle 10 traveled in the previous time, for example. Accordingly, it is possible to prevent the work vehicle 10 from traveling in the same place every time of performing the work. In this way, the traveling place of the work vehicle 10 can be dispersed instead of being fixed, and thus it is possible to prevent the topsoil of the field F from being damaged. Thus, it is possible to generate the target route R on which the work vehicle 10 is able to perform the work while performing automatic traveling without damaging the topsoil of the field F.

Further, according to the above-described configuration, by generating one reference candidate route r1, one or more candidate routes can be generated by use of the reference candidate route r1, and thus it is possible to prevent an increase in the processing load of the route generation in the automatic traveling system 1. Note that it is also possible that the automatic traveling system 1 only generates the reference candidate route r1 in advance and determines the target route R by generating other candidate routes at the point in time where the work starting instruction is obtained.

Further, since the automatic traveling system 1 generates the other candidate routes r2 and r3 based on the offset amount within the tolerance range corresponding to the reference candidate route r1, it is possible to change the travel route while maintaining the safety of the traveling and working of the work vehicle 10.

As another embodiment, it is also possible that the server 30 determines the offset amount for the reference candidate route r1 and outputs information of the determined offset amount to the work vehicle 10. In this case, if the work vehicle 10 obtains the aforementioned offset amount from the server 30, the work vehicle 10 sets the route obtained by adding the aforementioned offset amount to the reference candidate route r1 as the target route R, so as to perform automatic traveling. The server 30 may determine the aforementioned offset amount by a random number or may select an offset amount that is different from the previous work from among several preset offset amounts. Accordingly, it is possible for the server 30 or work vehicle 10 to reduce the data amount of route data to be stored.

Although the operation terminal 20 and the server 30 correspond to the route determination system according to the present invention in the above-described embodiment, it is also possible that the route determination system according to the present invention is configured with the operation terminal 20 alone or with the server 30 alone. Further, it is also possible that the route determination system according to the present invention is configured with one or more constituent elements of the operation terminal 20, the server 30, and the work vehicle 10.

REFERENCE SIGNS LIST

1 Automatic traveling system
10 Work vehicle
11 Vehicle control device
20 Operation terminal
30 Server
40 Base station
50 Satellite
211 Setting processing part
212 Generation processing part
213 Output processing part
311 Obtainment processing part
312 Determination processing part
313 Transfer processing part E1, E2 Edge point
F Field (work site)
R Target route
V Crop (work target object)
Vr Crop row
r1 Reference candidate route, candidate route (first candidate route)
r2 Candidate route (first candidate route)
r3 Candidate route (first candidate route)

The invention claimed is:

1. A route determination method for a work vehicle that comprising:

executing the work vehicle to perform automatic traveling in a predetermined order of rows while performing predetermined work on work target objects arranged in a plurality of rows in a work site, wherein a plurality of candidate routes are generated for the work vehicle where the candidate routes are for a target route, and the work vehicle is caused to automatically travel on the target route, and determining a first candidate route selected from the plurality of candidate routes, as the target route, wherein one reference candidate route is generated based on a position where the work target objects are arranged in the work site, and another candidate route is generated by offsetting of a predetermined distance from the reference candidate route.

2. The route determination method according to claim 1, wherein the predetermined distance is set based on at least one of a type and size of the work vehicle, an arrangement interval of the work target objects, and an inclination angle of the work site.

3. The route determination method according to claim 1, wherein the work target objects are arranged in the plurality of rows in the work site, and the reference candidate route is generated by connecting both edge points of each of the plurality of rows.

4. The route determination method according to claim 1, wherein the first candidate route is a candidate route that is different from a candidate route selected in previous work.

5. The route determination method according to claim 1, wherein the first candidate route is a candidate route selected by a user.

6. The route determination method according to claim 1, wherein the first candidate route is a candidate route selected based on a state of a topsoil of the work site.

7. The route determination method according to claim 1, wherein the target route includes a plurality of work routes, on which the work vehicle linearly travels while performing the predetermined work, and a movement route, on which the work vehicle moves between the work routes, the movement route includes turning routes connected to the work routes and a straight-traveling route connected to the turning routes, and turn-starting positions of the turning routes connected to the work routes respectively corresponding to the plurality of candidate routes are set to be positions that are different from each other, and turn-ending positions of the turning routes connected to the work routes respectively corresponding to the plurality of candidate routes are set to be positions that are different from each other.

8. The route determination method according to claim 7, wherein the straight-traveling route connected to the turning routes connected to the work routes respectively corresponding to the plurality of candidate routes are set as a common route.

9. The route determination method according to claim 1, further executing transferring route data of the target route to the work vehicle.

10. The route determination method according to claim 1, further executing displaying the plurality of candidate routes on an operation terminal of a user in display manners that are different from each other.

11. A route determination system comprising:

a work vehicle that performs automatic traveling in a predetermined order of rows while performing predetermined work on work target objects arranged in a plurality of rows in a work site, the work vehicle that is caused to travel on a target route where an operation terminal has a generation processing part that generates a plurality of candidate routes which are candidates for the target route, a terminal for generating a plurality of candidate routes on which the work vehicle automatically travels, where the candidate routes are for a target route; and a server that determines a first candidate route, which is selected from among the plurality of candidate routes, as the target route, wherein one reference candidate route is generated based on a position where the work target objects are arranged in the work site, and another candidate route is generated by offsetting of a predetermined distance from the reference candidate route.

12. A computer-readable, non-transitory medium, storing a route determination program for a work vehicle, causing one or more processors to execute:

generating a plurality of candidate routes which are candidates for a target route, on which the work vehicle that performs automatic traveling in a predetermined order of rows while performing predetermined work on work target objects arranged in a plurality of rows in a work site is caused to travel, and determining a first candidate route, which is selected from among the plurality of candidate routes, as the target route, wherein one reference candidate route is generated based on a position where the work target objects are arranged in the work site, and another candidate route is generated by offsetting of a predetermined distance from the reference candidate route.

* * * * *